United States Patent
Jonsson et al.

(10) Patent No.: US 11,852,513 B2
(45) Date of Patent: Dec. 26, 2023

(54) FUNCTIONAL STATE TRANSITION OF A SENSOR DEVICE BASED ON PROXIMITY CHANGE OF A TRANSPORT PROTECTION

(71) Applicant: ASSA ABLOY AB, Stockholm (SE)

(72) Inventors: Tomas Jonsson, Rönninge (SE); Mats Cederblad, Hässelby (SE); Johan Von Matern, Täby (SE)

(73) Assignee: ASSA ABLOY AB, Stockholm (SE)

(*) Notice: Subject to any disclaimer, the term of this patent is extended or adjusted under 35 U.S.C. 154(b) by 826 days.

(21) Appl. No.: 16/960,845

(22) PCT Filed: Dec. 18, 2018

(86) PCT No.: PCT/EP2018/085609
§ 371 (c)(1),
(2) Date: Jul. 8, 2020

(87) PCT Pub. No.: WO2019/141468
PCT Pub. Date: Jul. 25, 2019

(65) Prior Publication Data
US 2020/0355523 A1    Nov. 12, 2020

(30) Foreign Application Priority Data
Jan. 22, 2018 (EP) .................... 18152773

(51) Int. Cl.
G01D 7/00 (2006.01)
G01D 5/20 (2006.01)
H04W 4/50 (2018.01)

(52) U.S. Cl.
CPC .............. *G01D 7/00* (2013.01); *G01D 5/20* (2013.01); *H04W 4/50* (2018.02)

(58) Field of Classification Search
None
See application file for complete search history.

(56) References Cited

U.S. PATENT DOCUMENTS

| 5,670,886 A | 9/1997 | Wolff et al. |
| 2013/0017814 A1 | 1/2013 | Ali et al. |

(Continued)

FOREIGN PATENT DOCUMENTS

| CN | 103024137 | 4/2013 |
| CN | 104750220 | 7/2015 |

(Continued)

OTHER PUBLICATIONS

Extended Search Report for European Patent Application No. 18152773.0, dated Jul. 6, 2018, 8 pages.

(Continued)

*Primary Examiner* — Paul M. West
*Assistant Examiner* — Mark A Shabman
(74) *Attorney, Agent, or Firm* — Schwegman Lundberg & Woessner, P.A.

(57) ABSTRACT

It is provided a sensor device comprising: a proximity sensor (10); a processor (11); a wireless communication module (13); and a memory (14). When the sensor device is in a first functional state (20, 20a, 20b) and the proximity sensor detects a predetermined change in its proximity, the sensor device is configured to transition from the first functional state, in which wireless communication is inactivated, to a second functional state (21), in which wireless communication module is enabled. The predetermined change in its proximity is a removal of transport protection, comprising removal of a metallic tape over the proximity sensor, whereby the proximity sensor is capable to detect the removal of the metallic tape based on inductive sensing.

10 Claims, 3 Drawing Sheets

(56) References Cited

U.S. PATENT DOCUMENTS

| | | | |
|---|---|---|---|
| 2014/0104160 A1 | 4/2014 | Eriksson et al. | |
| 2015/0121108 A1 | 4/2015 | Agrawal et al. | |
| 2015/0248796 A1 | 9/2015 | Iyer et al. | |
| 2016/0050399 A1* | 2/2016 | Chuter | H04N 7/186 348/155 |
| 2016/0181857 A1 | 6/2016 | Konanur et al. | |
| 2017/0110911 A1 | 4/2017 | Bossetti et al. | |
| 2017/0160111 A1 | 6/2017 | Dowdall et al. | |
| 2017/0245346 A1 | 8/2017 | Betourney et al. | |
| 2017/0287312 A1* | 10/2017 | Schofield | G06F 1/3206 |
| 2017/0339642 A1 | 11/2017 | Bakker | |

FOREIGN PATENT DOCUMENTS

| | | |
|---|---|---|
| CN | 105191434 | 12/2015 |
| CN | 105379136 | 3/2016 |
| CN | 105631372 | 6/2016 |
| CN | 105900102 | 8/2016 |
| CN | 106471518 | 3/2017 |
| CN | 107067290 | 8/2017 |
| EP | 2305534 | 4/2011 |
| JP | 2007-308227 | 11/2007 |
| JP | 2014-185986 | 10/2014 |
| WO | WO 2013/012482 | 1/2013 |
| WO | WO 2014/159336 | 10/2014 |
| WO | WO 2016/094432 | 6/2016 |

OTHER PUBLICATIONS

International Search Report and Written Opinion for International (PCT) Patent Application No. PCT/EP2018/085609, dated Mar. 15, 2019, 14 pages.

Official Action with English Translation for China Patent Application No. 201880086939.0, dated Aug. 4, 2021, 13 pages.

* cited by examiner

FUNCTIONAL STATE TRANSITION OF A SENSOR DEVICE BASED ON PROXIMITY CHANGE OF A TRANSPORT PROTECTION

CROSS REFERENCE TO RELATED APPLICATIONS

This application is a national stage application under 35 U.S.C. 371 and claims the benefit of PCT Application No. PCT/EP2018/085609 having an international filing date of Dec. 18, 2018, which designated the United States, which PCT application claimed the benefit of Europe Patent Application No. 18152773.0 filed Jan. 22, 2018, the disclosure of each of which are incorporated herein by reference.

TECHNICAL FIELD

The invention relates to a sensor device, a method, a computer program and a computer program product for transitioning a sensor device between functional states based on a proximity change.

BACKGROUND

Sensors devices are self contained devices containing one or more sensors, processor, memory, power and wireless communication capabilities. These sensor devices have drastically reduced in size recently and are increasing in popularity for a variety of different uses. For instance, sensor devices can use an included proximity sensor to detect whether a barrier, such as a door or window, is open or closed.

Once the sensor device is manufactured, it is in a transportation state, in which all, or almost all, components are shut off. In this way, the sensor device can remain in transportation state and preserve power until the sensor device is installed. At installation, the sensor device needs to transition from its transportation state and power up the components of the sensor device to allow configuration and normal operation.

One known solution to achieve this transition is to have a reset button, which can be accessed through a hole in the casing, e.g. using a paper clip. However, it is preferable not to need a physical user input device which requires a perforation in the housing and/or inconvenient operation.

US 2017/0110911 A1 discloses methods for detecting mated coils. US 2017/0160111 A1 discloses a method and a system for monitoring building structures.

SUMMARY

It is an object to provide a way to alter a functional state of a sensor device which results in a sensor device which is more durable and reliable. According to a first aspect, it is provided a sensor device comprising: a proximity sensor; a processor; and a wireless communication module; a memory. When the sensor device is in a first functional state and the proximity sensor detects a predetermined change in its proximity, the sensor device is configured to transition from the first functional state, in which wireless communication is inactivated, to a second functional state, in which wireless communication module is enabled. The predetermined change in its proximity is a removal of transport protection, comprising removal of a metallic tape over the proximity sensor, whereby the proximity sensor is capable to detect the removal of the metallic tape based on inductive sensing The removal of transport protection may comprise removal of the sensor device from packaging.

The memory may store instructions that, when executed by the processor, cause the sensor device to, when in the second functional state, receive configuration commands via the wireless communication module.

The sensor device may comprise a housing that completely encloses the sensor device.

The first functional state may be a transportation state and the second functional state may be a configuration state.

According to a second aspect, it is provided a method for transitioning between functional states of a sensor device, the method being performed in the sensor device, comprising a proximity sensor and a wireless communication module. The method comprises the steps of: detecting a predetermined change in a proximity of the proximity sensor, wherein the predetermined change in its proximity is a removal of transport protection, comprising removal of a metallic tape over the proximity sensor, whereby the proximity sensor detects the removal of the metallic tape based on inductive sensing; and performing, based on detecting the predetermined change in the proximity of the proximity sensor, a transition from a first functional state, in which wireless communication is inactivated, to a second functional state, in which wireless communication module is enabled.

The removal of transport protection may comprise removal of the sensor device from packaging.

The method may further comprise the step of: receiving, when in the second functional state, configuration commands via the wireless communication module.

According to a third aspect, it is provided a computer program for transitioning between functional states of a sensor device. The computer program comprises computer program code which, when run on a sensor device comprising a proximity sensor and a wireless communication module causes the sensor device to: detect a predetermined change in a proximity of the proximity sensor, wherein the predetermined change in its proximity is a removal of transport protection, comprising removal of a metallic tape over the proximity sensor, whereby the proximity sensor detects the removal of the metallic tape based on inductive sensing; and perform, based on detecting the predetermined change in the proximity of the proximity sensor, a transition from a first functional state, in which wireless communication is inactivated, to a second functional state, in which wireless communication module is enabled.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that state transitions for sensor devices can be achieved using its proximity sensor. By providing a predetermined change in the proximity of the proximity sensor, e.g. for assuming a configuration state, a convenient, power efficient and user friendly way of controlling state transitions is provided. The proximity sensor is provided inside an enclosure of the housing of the sensor device, whereby an all-encompassing housing can be provided while still allowing external control of the sensor device to control its functional state.

Figure 1:
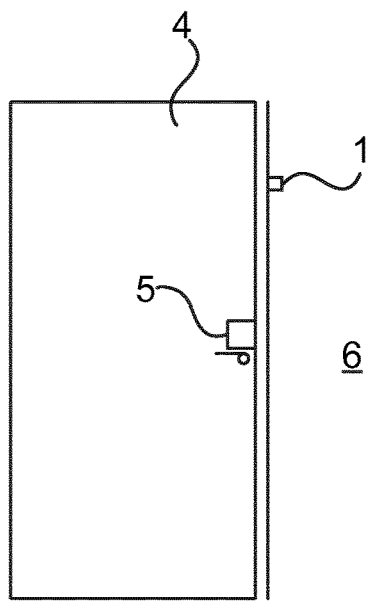
FIG. 1 is a schematic diagram illustrating an environment in which embodiments presented herein can be applied.

FIG. 1 is a schematic diagram illustrating an environment in which embodiments presented herein can be applied.

A barrier 4, which can be e.g. be a window, door, cabinet front, drawer, gate, etc., can be manipulated to be in either an open state or a closed state. Optionally, the ability to open the barrier 4 is selectively controlled using a lock 5. An opposing structure 6 is provided to allow the barrier 5 to be kept in a closed state. In, or attached to, the opposing structure 6, one or more sensor devices 1 are provided. The, or each, sensor device 1 comprises one or more environment sensors, e.g. to detect the presence of the barrier 4, to thereby determine whether the barrier 4 is open or closed.

Figure 2:
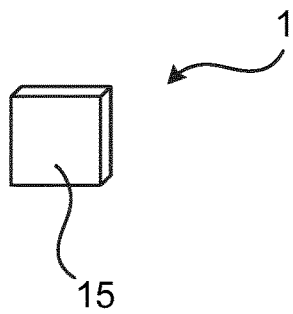
FIG. 2 is a schematic diagram illustrating the sensor device of FIG. 1, where the housing of the sensor device is illustrated.

FIG. 2 is a schematic diagram illustrating the sensor device of FIG. 1 where the housing of the sensor device is seen.

The sensor device 1 can be made very small, about 10 mm×10 mm×3 mm. Other sizes are also possible. The sensor device 1 contains all components (see FIG. 3 and text below) inside its housing 15. In embodiments presented herein, a predetermined change in a proximity environment of a proximity sensor of the sensor device is used to control the functional state of the sensor device. In this way, the housing can be provided such that it completely encloses the sensor device 1. Hence, there are no perforations in the enclosure, e.g. for components such as buttons, etc. as is provided in the prior art. The completely enclosing housing 15 provides excellent durability and reliability since the housing protects both from physical damage and from environmental issues such as water, etc.

Figure 3:
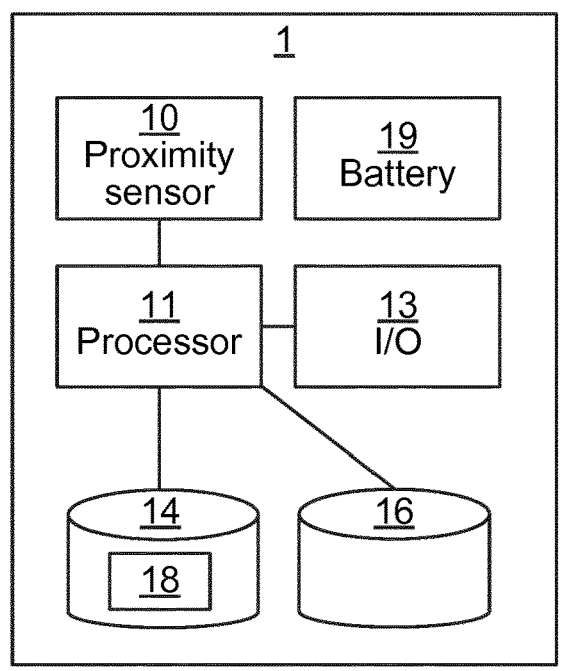
FIG. 3 is a schematic diagram illustrating components of the sensor device of FIG. 1 and FIG. 2 according to one embodiment.

FIG. 3 is a schematic diagram illustrating components of the sensor device of FIG. 1 and FIG. 2 according to one embodiment. A processor 11 is provided using any combination of one or more of a suitable central processing unit (CPU), multiprocessor, microcontroller, digital signal processor (DSP), capable of executing software instructions 18 stored in a memory 14, which can thus be a computer program product. The processor 11 could alternatively be implemented using an application specific integrated circuit (ASIC), field programmable gate array (FPGA), etc. The processor 11 can be configured to execute the method described with reference to FIG. 5 below.

The memory 14 can be any combination of random access memory (RAM) and/or read only memory (ROM). The memory 14 also comprises persistent storage, which, for example, can be any single one or combination of solid-state memory, magnetic memory, and optical memory.

A data memory 16 is also provided for reading and/or storing data during execution of software instructions in the processor 11. The data memory 16 can be any combination of RAM and/or ROM.

The sensor device 1 further comprises wireless communication module 13 for wireless radio communication with other external entities. The wireless communication module 13 can support any suitable wireless protocol, e.g. Bluetooth or Bluetooth Low Energy (BLE), ZigBee, any of the IEEE 802.11x standards (also known as WiFi), etc.

One or more proximity sensors 10 can be used to gain information about the environment of the sensor device 1. For instance, the environment sensor 10 can be a proximity sensor, which can detect the presence of an object in the vicinity of the sensor device 1. Optionally, the proximity sensor 10 is based on inductive sensing, whereby the presence of metal is detected. For instance, this allows the proximity sensor to detect removal of metallic tape. The metallic tape can form part of transport protection for the sensor device. Alternatively or additionally, the proximity sensor is based on magnetic field detection.

Only when a particular predetermined change in its proximity is detected, does the proximity sensor 10 provide a wakeup signal to the rest of the sensor device, e.g. by sending a wakeup signal to the processor 11. The processor 11 can then set other components of the sensor device in an appropriate state depending on the need for performance vis-à-vis power usage. This can cause the sensor device 1 to alter its functional state, e.g. to a configuration state or operational state (see FIGS. 4A-B).

The sensor device 1 further comprises a battery 19 which is also enclosed by the housing. The battery 19 powers all electric and electronic components of the sensor device 1. Due to the low power consumption of the sensor device 1, the battery 19 can power the sensor device 1 for a very long time, in the order of years. Hence, the battery can be a single use battery, which is not neither exchangeable nor chargeable. Since the type of battery is known from production, battery status determination (e.g. charge level) can be performed in a reliable manner.

Other components of the sensor device 1 are omitted in order not to obscure the concepts presented herein.

Figure 4A:
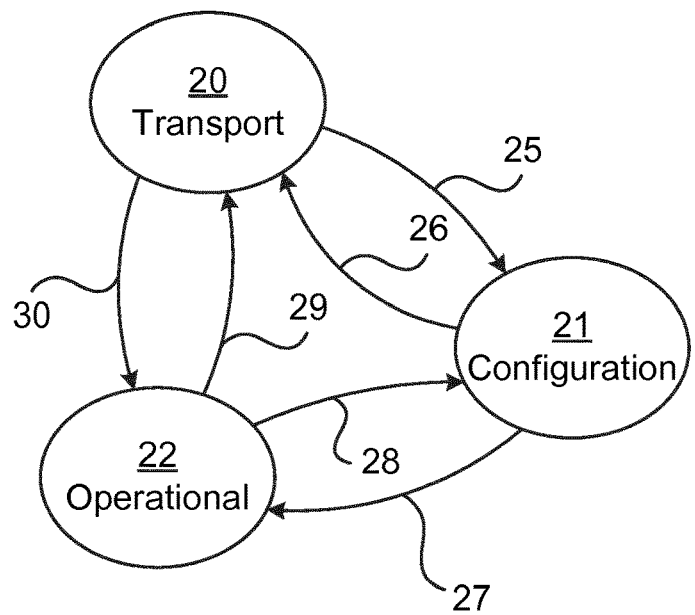
FIGS. 4A-B are state diagrams illustrating functional states of the sensor device of FIGS. 1-3.
Figure 4B:
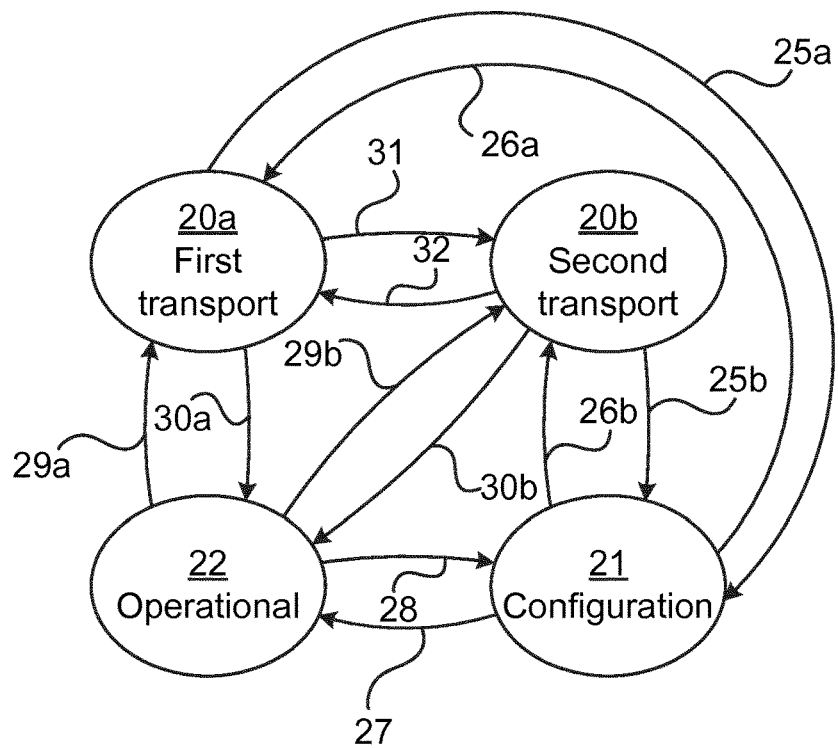

FIGS. 4A-B are state diagrams illustrating functional states of the sensor device 1 of FIGS. 1-3. First, the embodiment illustrated in FIG. 4A will be described, where there are three functional states 20, 21, 22. Each functional state differs from other functional states in the type of functionality that is provided by the sensor device. There can be more or fewer functional states, as long as there is at least a transport state and another state.

In a transport state 20, the sensor device is in a state of reduced activity to prevent any radio transmissions and to save power. The only component which needs to be responsive is the proximity sensor and optionally parts or all of the processor is activated periodically in order to poll to detect predetermined changes in the proximity of the proximity sensor. The polling interval can be very long, several seconds or even minutes, to minimise power consumption while in the transport state. It is sufficient if the change is detected between two polling instances.

Optionally, in the transport state 20, the sensor device is able to detect careless and rough handling.

In a configuration state 21, the sensor device can be paired with another device, e.g. using BLE. A system interface can be available for configuration of the sensor device and information gathering for troubleshooting, such as checking a communication link with a gateway, etc. In the configuration state 21, the sensor device can be configured using wireless communication e.g. over BLE. For instance, a smartphone, tablet computer, laptop computer or desktop computer can be used to send configuration commands to the sensor device over the wireless interface.

In an operational state 22, the sensor device is in a normal operational state and communicates and senses it environment according to its programmed and configured function.

When in the transport state 20, the sensor device can transition 25 to the configuration state 21 when the sensor device detects a predetermined change in the proximity of the sensor device. Also, the sensor device can be made to transition 3o from the transport state 20 to the operational state 22 by detecting a predetermined change in the proximity of the sensor device.

When in the configuration state 21, the sensor device can transition 26 to the transport state 20 by receiving an appropriate command from an external device, e.g. after performing a short configuration and/or storing a time stamp, after which the transport state should be assumed. Since the wireless interface is available in the configuration state 21, the command can be sent using the wireless interface. Optionally, the transition 26 to the transport state 20 occurs if no configuration occurs within a time-out period. This allows e.g. a manufacturer to mount the sensor device in a barrier structure (e.g. window and window frame, or door and door frame) without configuring the sensor device, after which the sensor device returns to the low-power transport state 20. Once the barrier structure is installed, the transition 25 to the configuration state 21 can be triggered e.g. by repeatedly opening and closing the barrier. At that point, the sensor device can be configured once the barrier structure is installed. Similarly, a command can be transmitted to the sensor device, causing the sensor device to transition 27 from the configuration state 21 to the operational state.

When in the operational state 22, the sensor device can transition 29 to the transport state 20 by receiving an appropriate command from an external device. Since the wireless interface is available in the operational state 22, the command can be sent using the wireless interface. Similarly, a command can be transmitted to the sensor device, causing the sensor device to transition 28 from the operational state 22 to the configuration state 21.

It is to be noted that all transitions mentioned here do not need to be implemented, as long as there the transition 25 from the transport state to the configuration state 21, and the transition 27 from the configuration state 21 to the operational state 22 are implemented.

Looking now to FIG. 4B, this is similar to FIG. 4A and only new or modified features compared to FIG. 4A will be described.

Here, there is a first transport state 20a and a second transport state 20b. The transition from a transport state 20a, 20b to the configuration state 21 is split into a first transition 25a and a second transition 25b, respectively. The transition from the configuration state 21 to a transport state 20a, 20b is split into a first transition 26a and a second transition 26b, respectively.

The transition from a transport state 20a, 20b to the operational state 22 is split into a first transition 30a and a second transition 30b, respectively. The transition from the operational state 22 to a transport state 20a, 20b is split into a first transition 29a and a second transition 29b, respectively.

Moreover, there is a transition 31 from the first transport state 20a to the second transport state 20b, as well as a transition 32 from the second transport state 20b to the first transport state 20a.

The mechanism of the transition 31 from the first transport state 20a to the second transport state 20b can differ from the transition 25b from the second transport state 20b to the configuration state 21. For instance, the transition 31 from the first transport state 20a to the second transport state 20b can occur due to a removal of a non-magnetic (optionally still metallic) transport protection and the transition 24b from the second transport state 20b to the configuration state 21 can occur due to a removal of a magnetic transport protection (or vice versa). In another embodiment, one transition involves the removal of cardboard packaging and the other transition involves removal of metallic tape.

For instance, the first transport state 20a can correspond to a transport state of the sensor device in an unmounted state, while the second transport state 20b can correspond to when a barrier structure, comprising the sensor device, is transported. In this way, the transitions between the different states can be recorded in memory for advanced statistical analysis of logistical movement.

Optionally, when assuming the second transport state 20b, the sensor device can receive data over the wireless interface for a specific period, allowing e.g. a manufacturer to store data in the sensor device, such as mounting date, etc.

Figure 5:
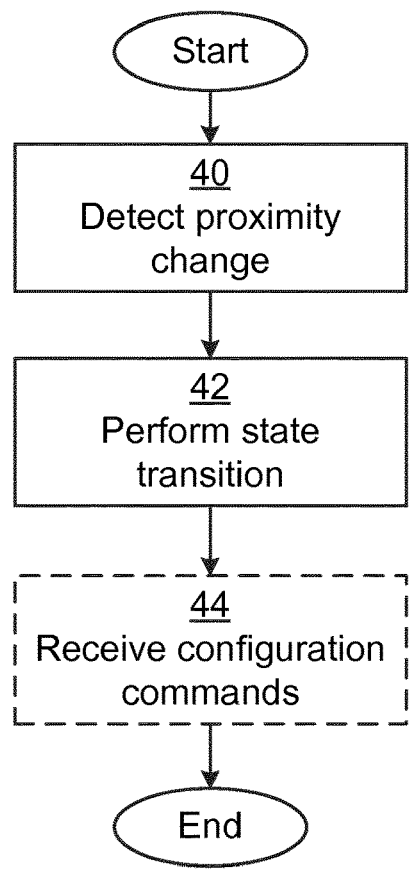
FIG. 5 is a flow chart illustrating embodiments of methods transitioning between functional states of a sensor device.

FIG. 5 is a flow chart illustrating embodiments of methods transitioning between functional states of a sensor device, e.g. the sensor device of FIGS. 1-3 described above. The sensor device comprises at least one environment sensor (such as a proximity sensor) and a wireless communication module.

In a detect proximity change step 40, the sensor device detects a predetermined change in a proximity of the proximity sensor. The predetermined change in its proximity is a removal of transport protection, more specifically metallic tape over the proximity sensor and optionally removal of the sensor device from packaging. The removal of the metallic tape is detected by the proximity sensor based on inductive sensing. In one embodiment, the transport protection is an enclosure (e.g. a box) containing the sensor device, where the box can be of a material (e.g. metal) that prevents any changes in the environment outside the box from influencing the proximity sensor. In one embodiment, the proximity sensor can detect material within a specific range, e.g. 10 mm. The transport protection can in that case be e.g. a cardboard box which ensures that the proximity sensor is located within the box, at least a distance (optionally including a safety margin) corresponding to the specific range from the exterior of the box.

In a perform state transition step 42, the sensor device performs, based on detecting the predetermined change in the proximity of the proximity sensor, a transition from a first functional state to a second functional state. In the first functional state, as explained above, wireless communication is inactivated. In the second functional state, wireless communication module is enabled. The first functional state can be the transport state and the second functional state can be the configuration state or the operational state. The transition can involve sending a wakeup signal to wake up one or more components of the sensor device from a sleep state.

In an optional receive configuration commands step 44, the sensor device receives configuration commands via the wireless communication module. This step is only performed when the sensor device is in the second functional state.

Figure 6:
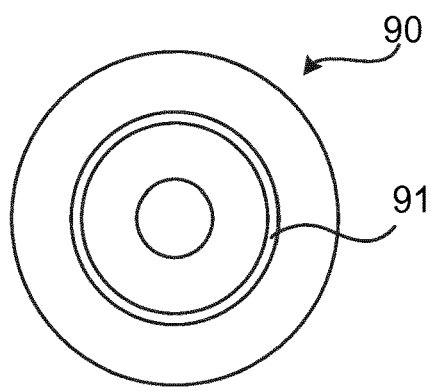
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 14 of FIG. 3. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A sensor device comprising:
a proximity sensor;
a processor;
a wireless communication module; and
a memory;
wherein when the sensor device is in a first functional state and the proximity sensor detects a predetermined change in its proximity, the sensor device is configured to transition from the first functional state, in which wireless communication is inactivated, to a second functional state, in which wireless communication module is enabled.

ii. The sensor device according to embodiment i, wherein the predetermined change in its proximity is a removal of transport protection.

iii. The sensor device according to embodiment ii, wherein the removal of transport protection comprises removal of a metallic tape over the proximity sensor.

iv. The sensor device according to embodiment ii or iii, wherein the removal of transport protection comprises removal of the sensor device from packaging.

v. The sensor device according to any one of the preceding embodiments, wherein the memory stores instructions that, when executed by the processor, cause the sensor device to, when in the second functional state, receive configuration commands via the wireless communication module.

vi. The sensor device according to any one of the preceding embodiments, wherein the sensor device comprises a housing that completely encloses the sensor device.

vii. The sensor device according to any one of the preceding embodiments, wherein the first functional state is a transportation state and the second functional state is a configuration state.

viii. A method for transitioning between functional states of a sensor device, the method being performed in the sensor device, comprising a proximity sensor and a wireless communication module, the method comprising the steps of:
detecting a predetermined change in a proximity of the proximity sensor; and
performing, based on detecting the predetermined change in the proximity of the proximity sensor, a transition from a first functional state, in which wireless communication is inactivated, to a second functional state, in which wireless communication module is enabled.

ix. The method according to embodiment viii, wherein the predetermined change in its proximity is a removal of transport protection.

x. The method according to embodiment ix, wherein the removal of transport protection comprises removal of a metallic tape over the proximity sensor.

xi. The method according to embodiment ix or x, wherein the removal of transport protection comprises removal of the sensor device from packaging.

xii. The method according to any one of embodiments viii to xi, further comprising the step of:
receiving, when in the second functional state, configuration commands via the wireless communication module.

xiii. A computer program for transitioning between functional states of a sensor device, the computer program comprising computer program code which, when run on a sensor device comprising a proximity sensor and a wireless communication module causes the sensor device to:
detect a predetermined change in a proximity of the proximity sensor; and
perform, based on detecting the predetermined change in the proximity of the proximity sensor, a transition from a first functional state, in which wireless communication is inactivated, to a second functional state, in which wireless communication module is enabled.

xiv. A computer program product comprising a computer program according to embodiment xiii and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A sensor device comprising:
a proximity sensor;
a processor;
a wireless communication module; and
a memory;
wherein when the sensor device is in a first functional state and the proximity sensor detects a predetermined change in its proximity, the sensor device configured to transition from the first functional state, in which wireless communication is inactivated, to a second functional state, in which wireless communication module is enabled;
wherein the predetermined change in its proximity is a removal of transport protection, comprising removal of a metallic tape over the proximity sensor, whereby the proximity sensor is capable to detect the removal of the metallic tape based on inductive sensing.

2. The sensor device according to claim 1, wherein the removal of transport protection comprises removal of the sensor device from packaging.

3. The sensor device according to claim 1, wherein the memory stores instructions that, when executed by the processor, cause the sensor device to, when in the second functional state, receive configuration commands via the wireless communication module.

4. The sensor device according to claim 1, wherein the sensor device comprises a housing that completely encloses the sensor device.

5. The sensor device according to claim 1, wherein the first functional state is a transportation state and the second functional state is a configuration state.

6. A method for transitioning between functional states of a sensor device, the method being performed in the sensor device, comprising a proximity sensor and a wireless communication module, the method comprising:

detecting a predetermined change in a proximity of the proximity sensor, wherein the predetermined change in its proximity is a removal of transport protection, comprising removal of a metallic tape over the proximity sensor, whereby the proximity sensor detects the removal of the metallic tape based on inductive sensing; and performing, based on detecting the predetermined change in the proximity of the proximity sensor, a transition from a first functional state in which wireless communication is inactivated, to a second functional state, in which wireless communication module is enabled.

7. The method according to claim 6, wherein the removal of transport protection comprises removal of the sensor device from packaging.

8. The method according to claim 6, further comprising:
　　receiving, when in the second functional state, configuration commands via the wireless communication module.

9. A computer program for transitioning between functional states of a sensor device, the computer program comprising computer program code which, when run on a sensor device comprising a proximity sensor and a wireless communication module causes the sensor device to:

detect a predetermined change in a proximity of the proximity sensor wherein the predetermined change in its proximity is a removal of transport protection, comprising removal of a metallic tape over the proximity sensor, whereby the proximity sensor detects the removal of the metallic tape based on inductive sensing; and perform, based on detecting the predetermined change in the proximity of the proximity sensor, a transition from a first functional state, in which wireless communication is inactivated, to a second functional state, in which wireless communication module is enabled.

10. A computer program product comprising a computer program according to claim 9 and a computer readable means on which the computer program is stored.

* * * * *